Jan. 7, 1936.  F. CARTLIDGE  2,027,091
LOADING MACHINE
Original Filed Aug. 2, 1930  15 Sheets-Sheet 2
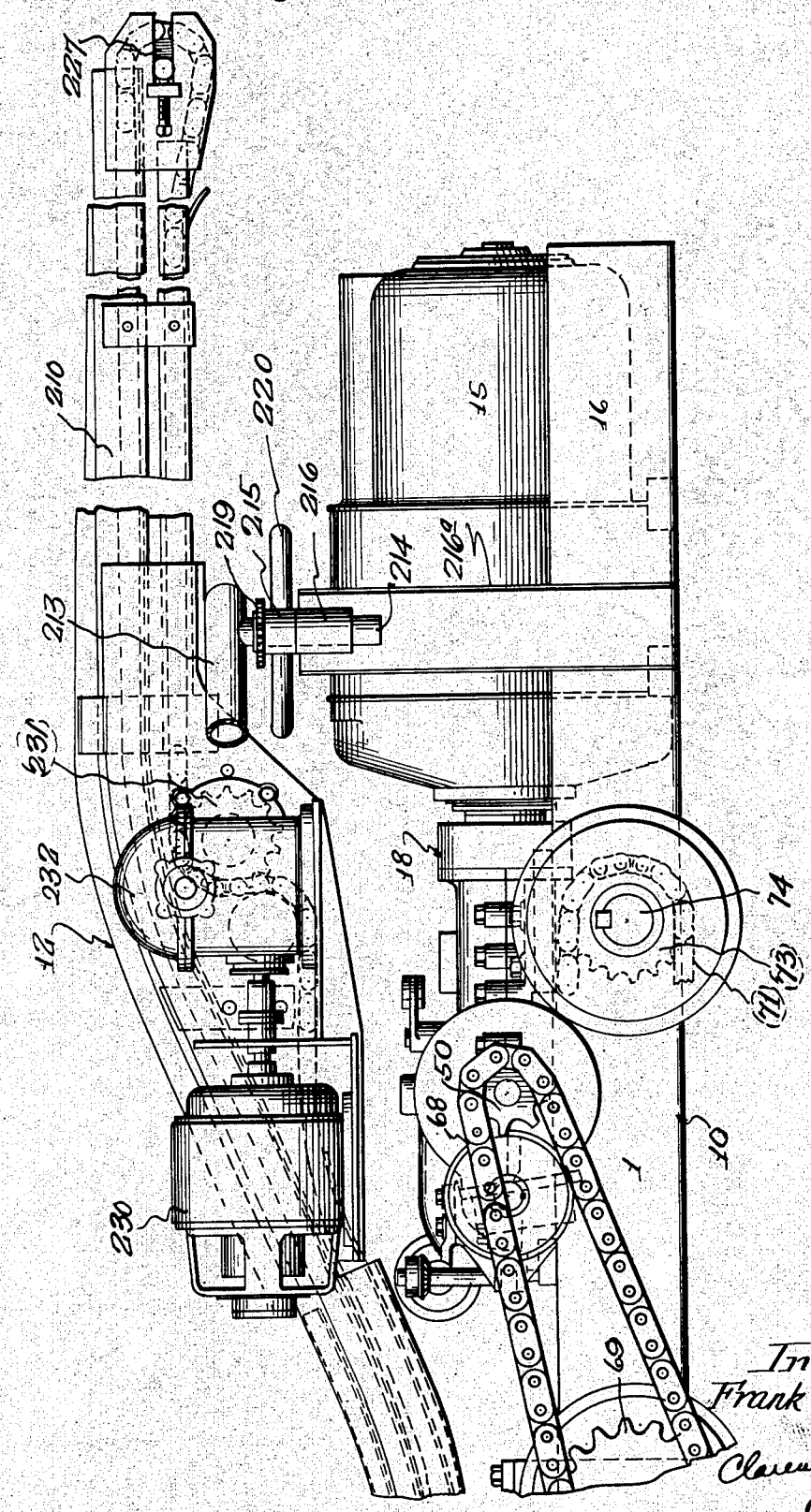
Inventor
Frank Cartlidge
Clarence F. Poole
Attorney

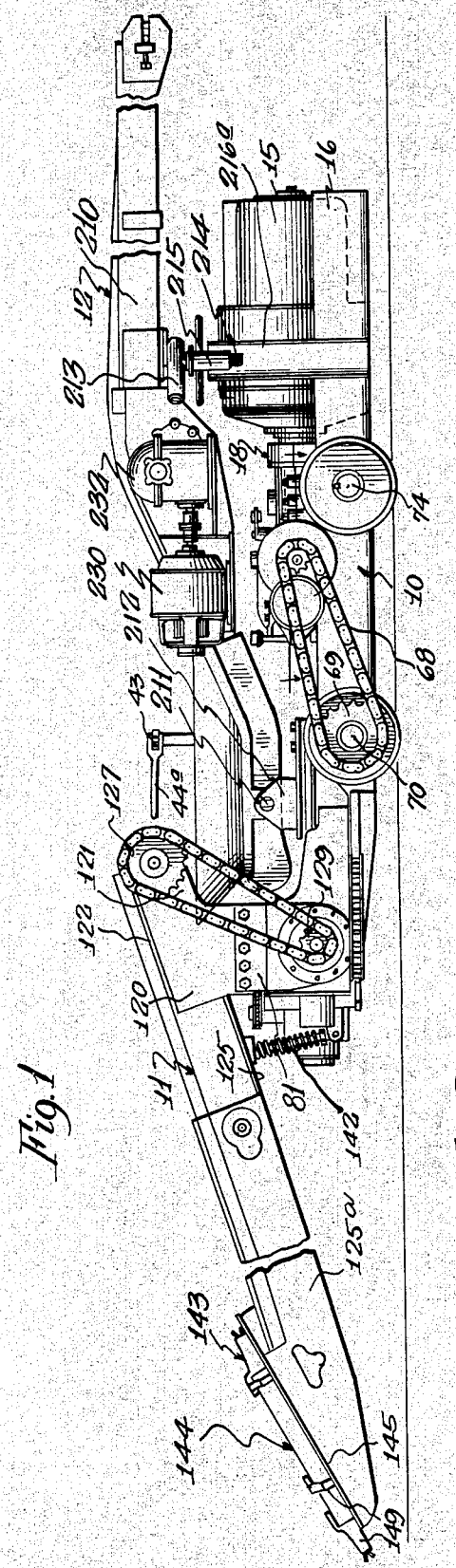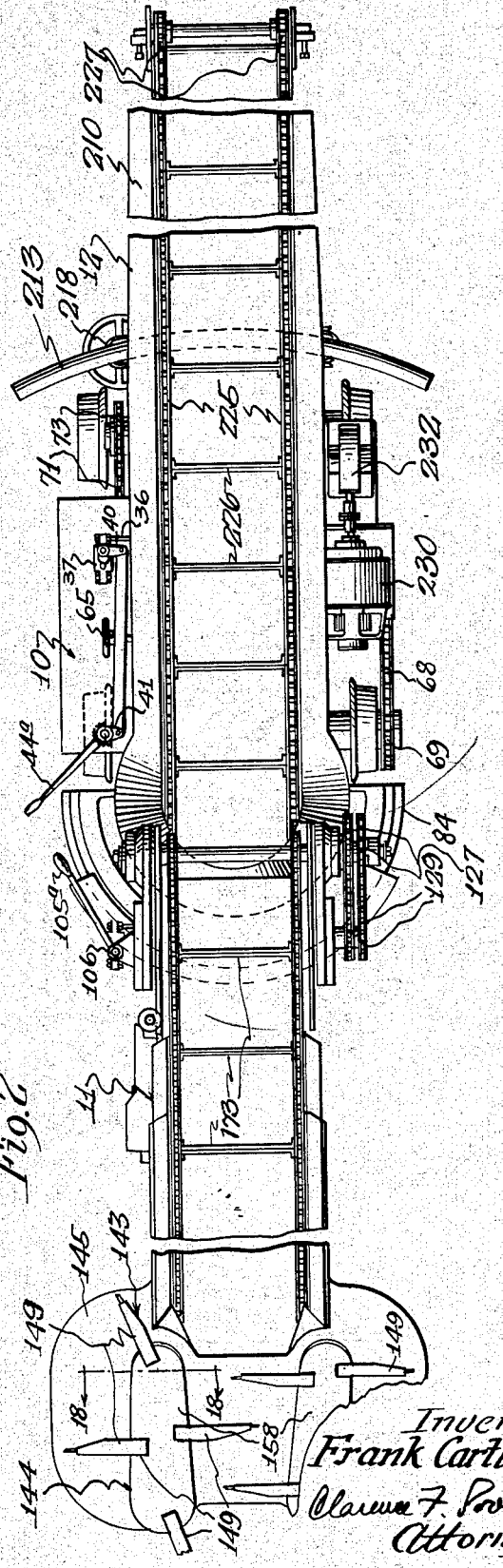

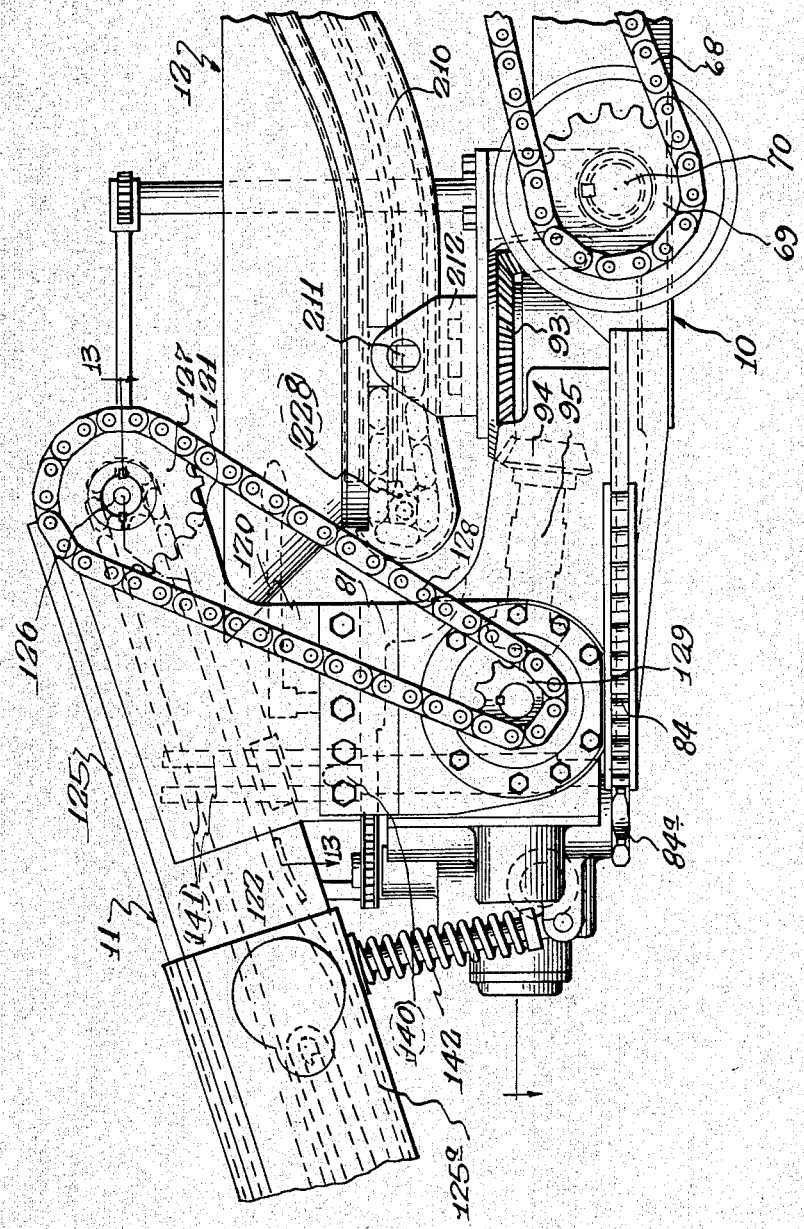

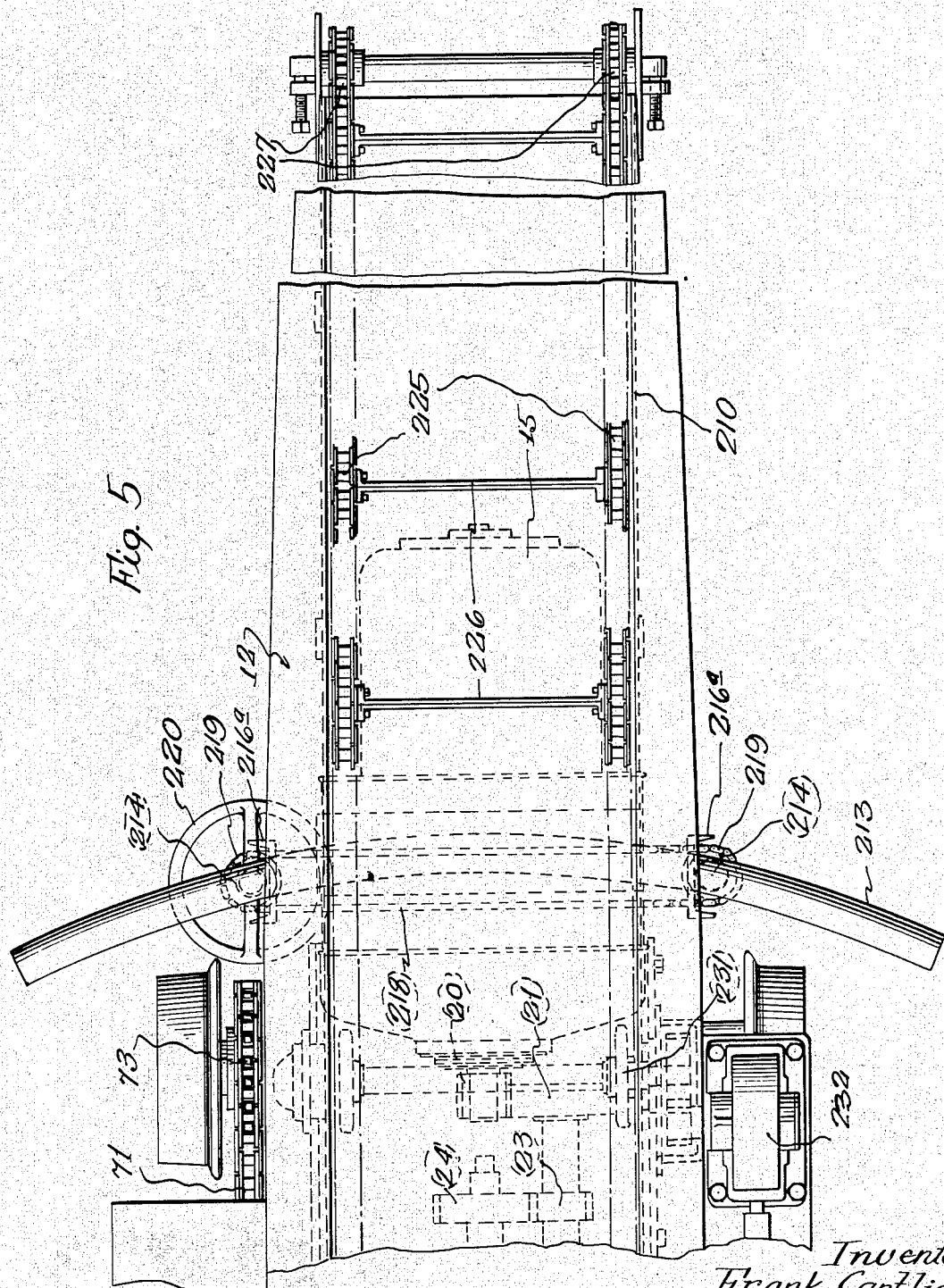

Jan. 7, 1936. F. CARTLIDGE 2,027,091
LOADING MACHINE
Original Filed Aug. 2, 1930 15 Sheets-Sheet 5
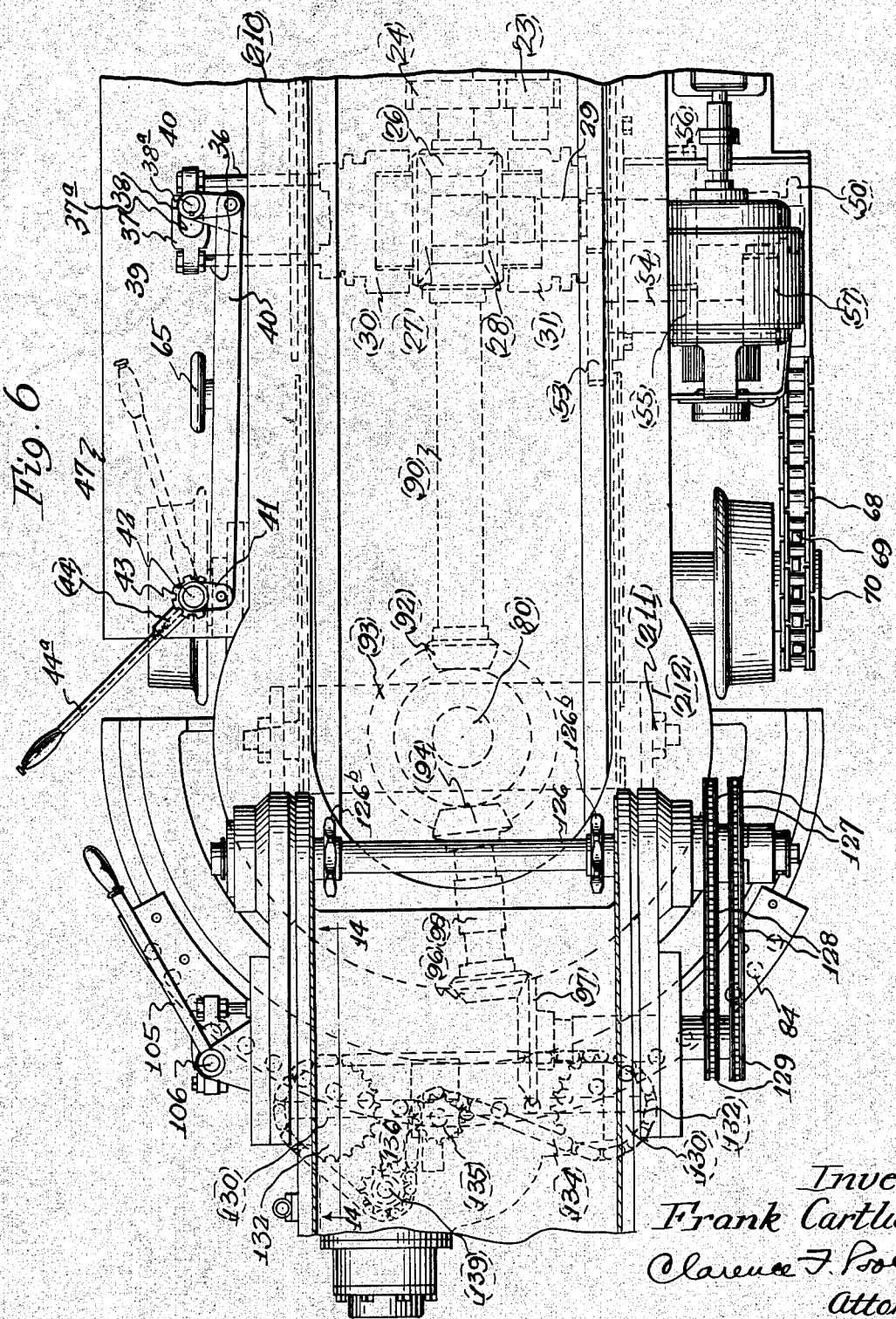
Inventor
Frank Cartlidge
Clarence F. Poole
Attorney

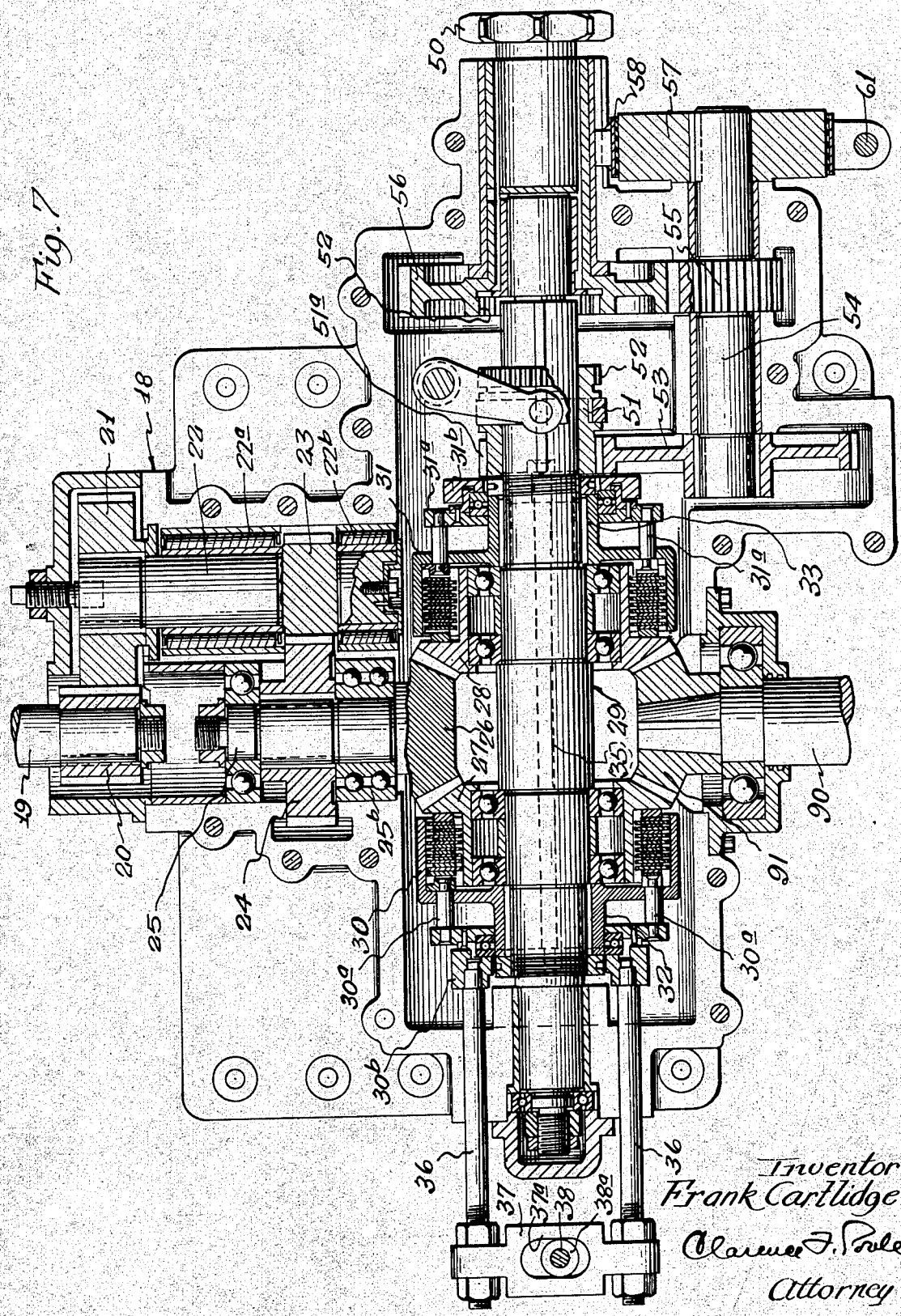

Jan. 7, 1936.  F. CARTLIDGE  2,027,091
LOADING MACHINE
Original Filed Aug. 2, 1930   15 Sheets-Sheet 7

Inventor
Frank Cartlidge
Clarence F. Poole
Attorney

Jan. 7, 1936.  F. CARTLIDGE  2,027,091
LOADING MACHINE
Original Filed Aug. 2, 1930 15 Sheets-Sheet 8
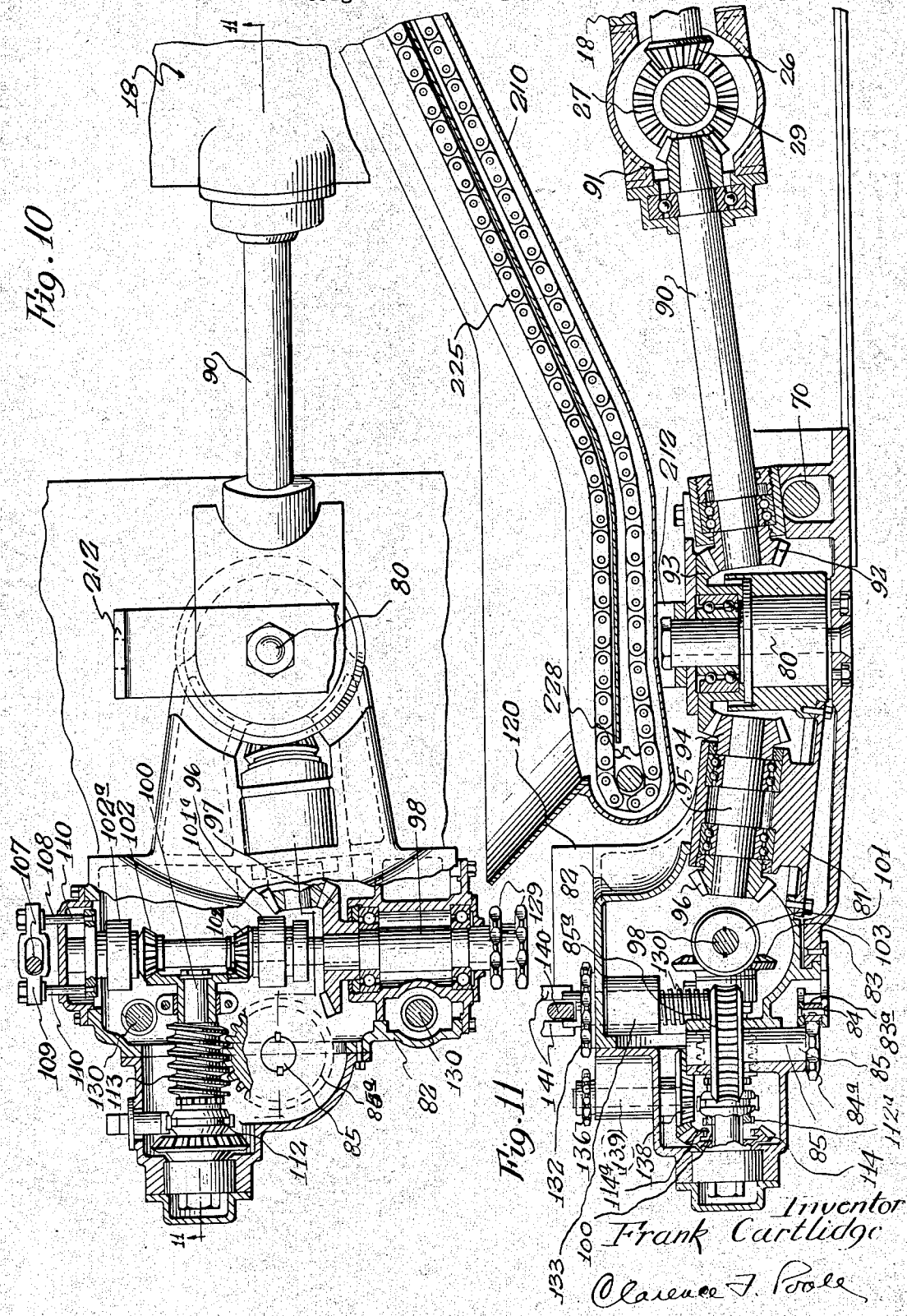

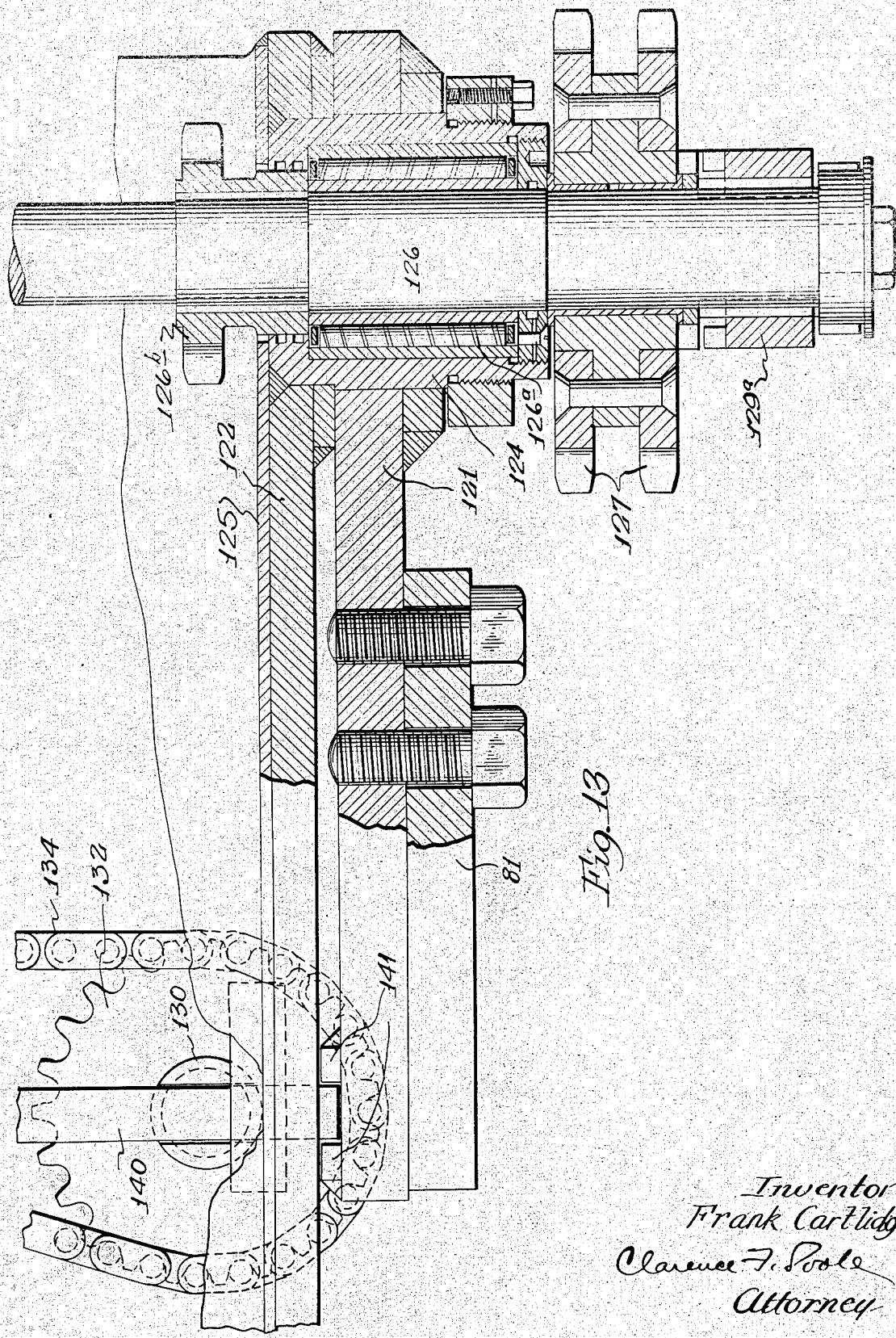

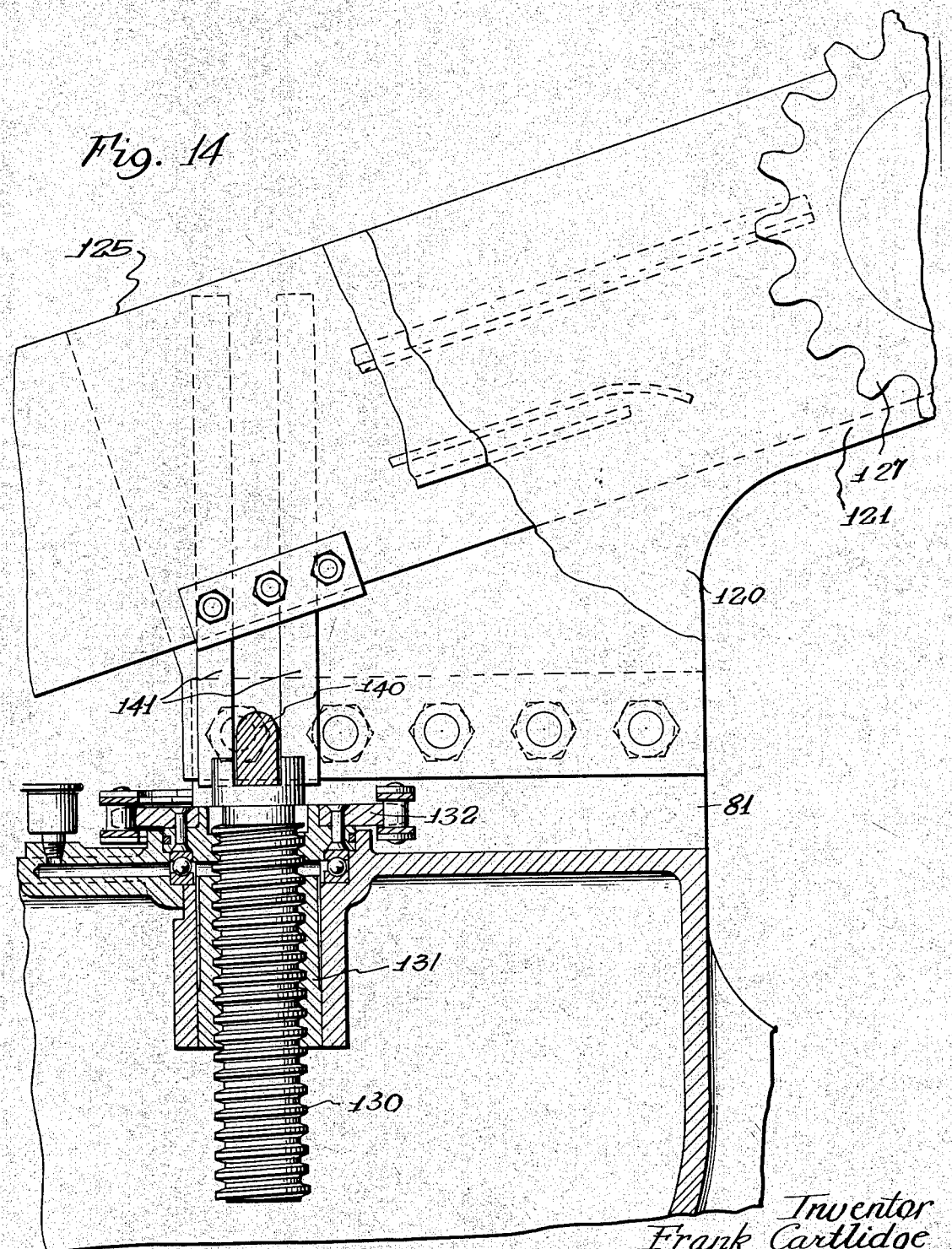

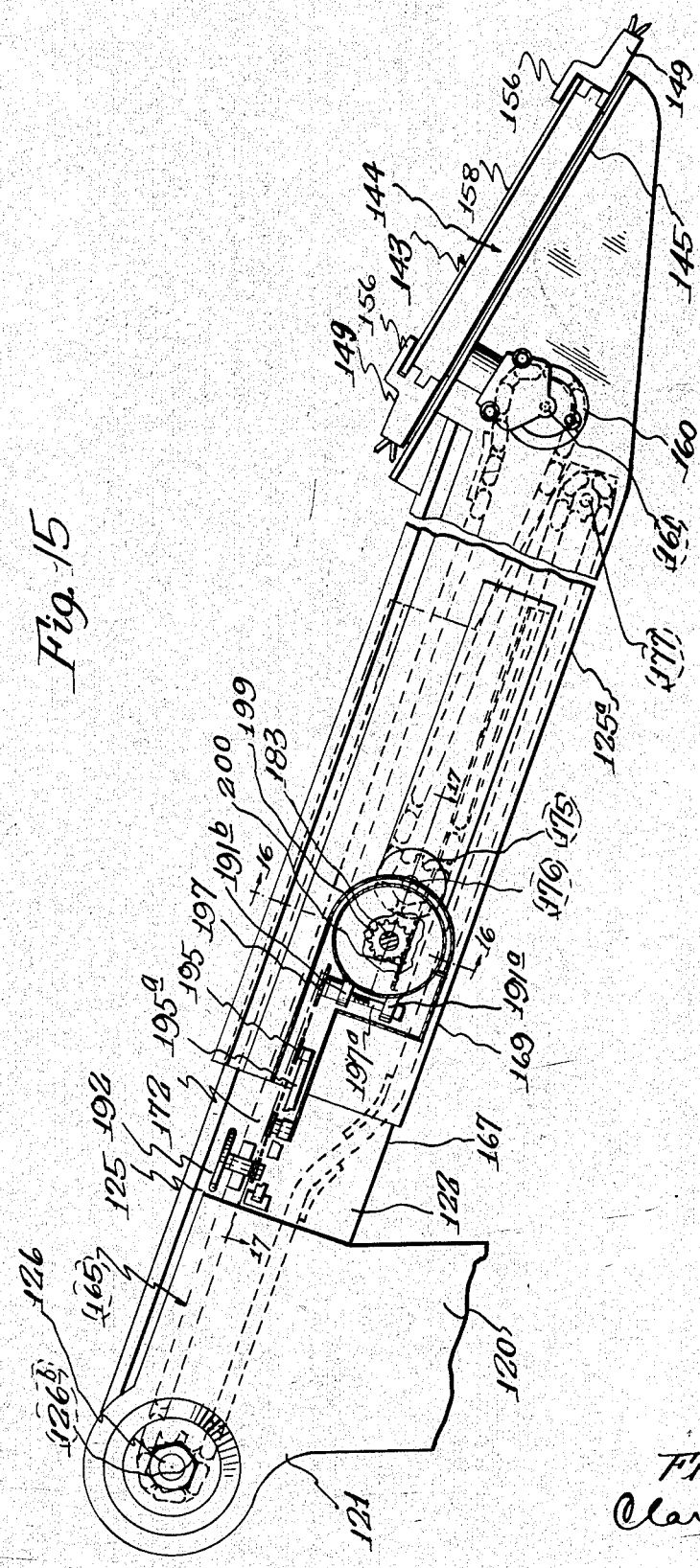

Jan. 7, 1936.　　　　F. CARTLIDGE　　　　2,027,091
LOADING MACHINE
Original Filed Aug. 2, 1930　　15 Sheets-Sheet 13
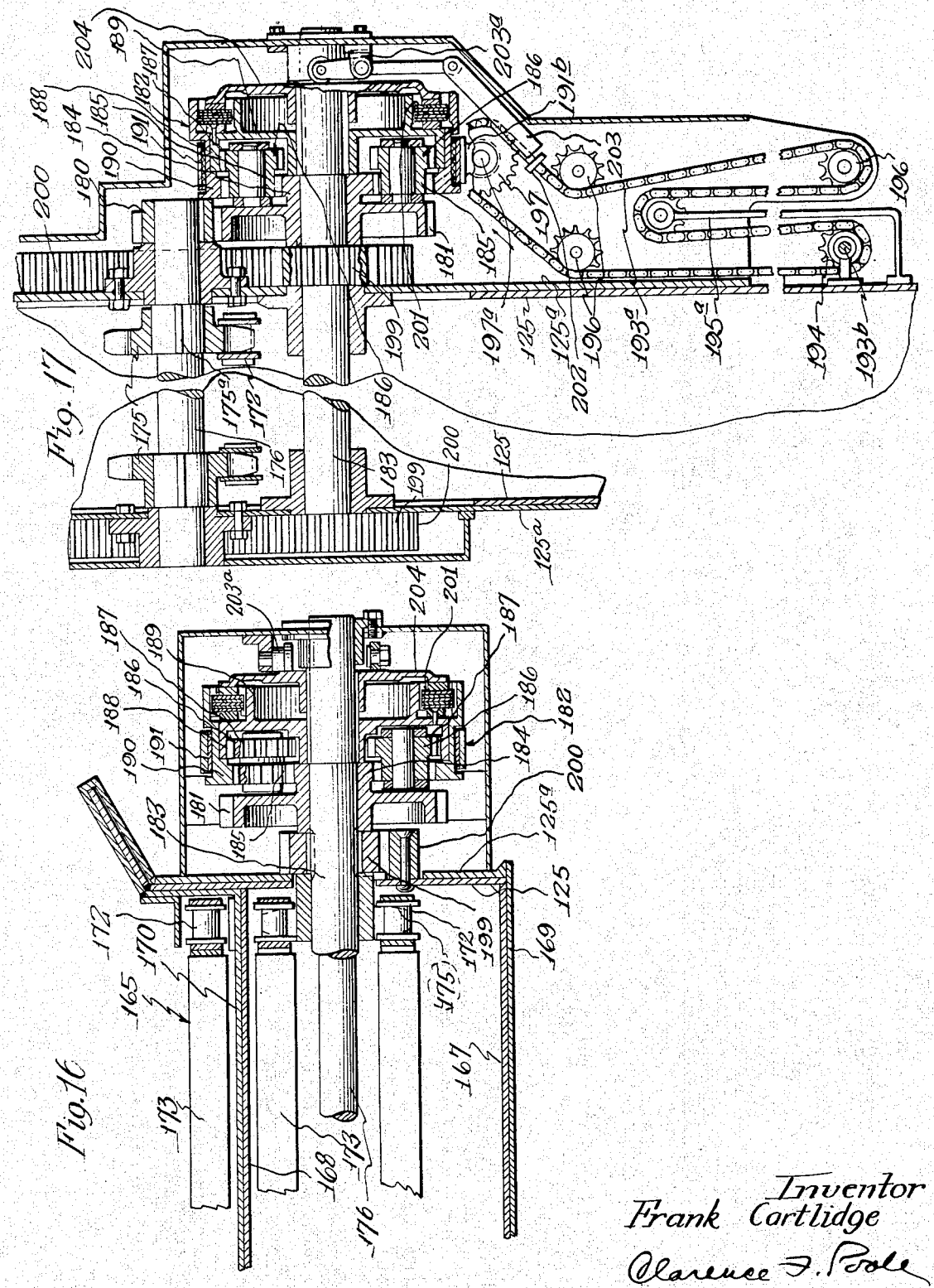
Inventor
Frank Cartlidge
Clarence F. Poole
Attorney

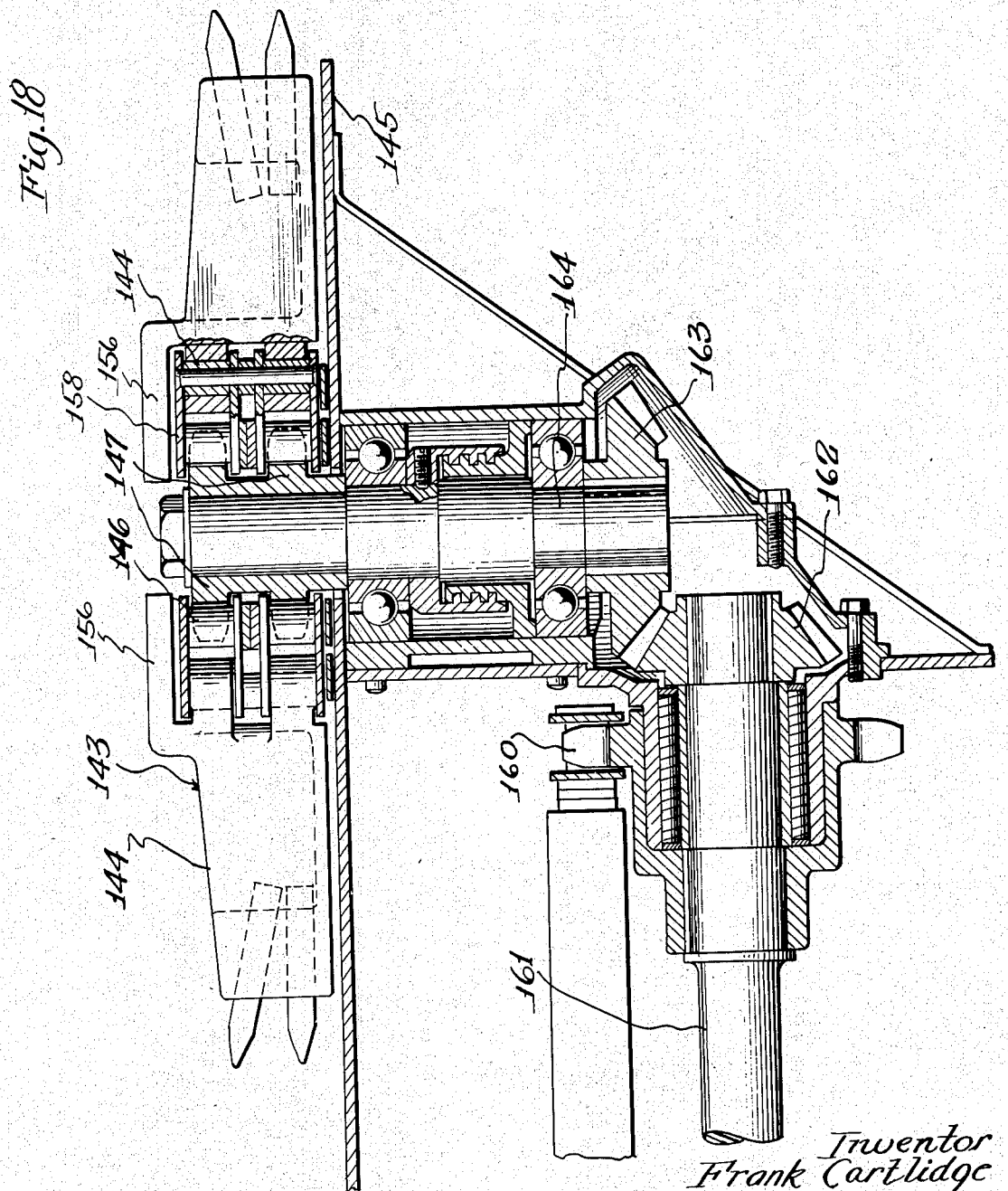

Jan. 7, 1936.  F. CARTLIDGE  2,027,091
LOADING MACHINE
Original Filed Aug. 2, 1930   15 Sheets-Sheet 15
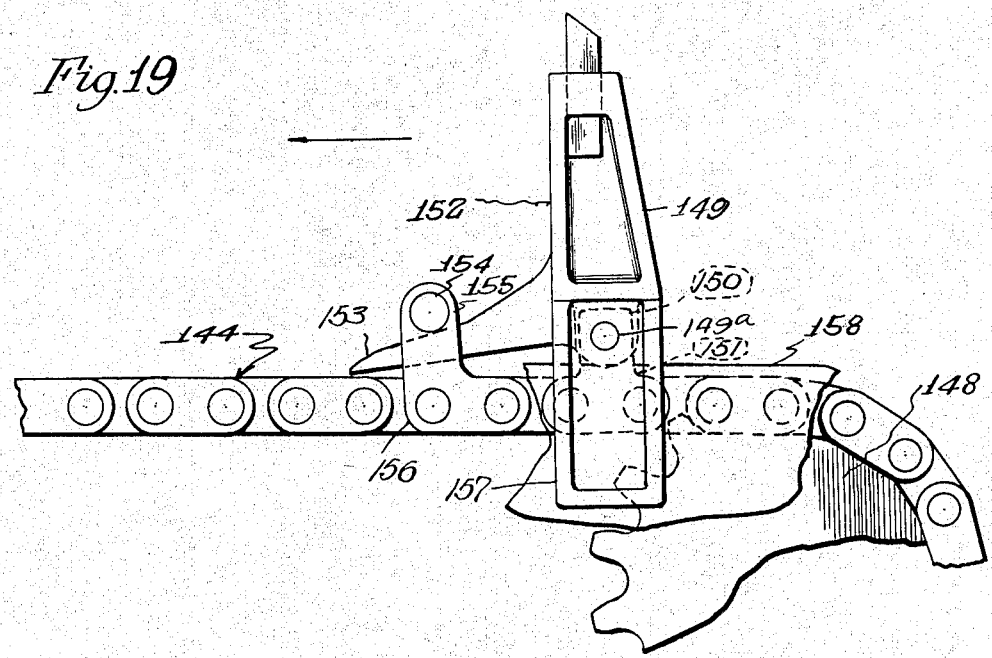
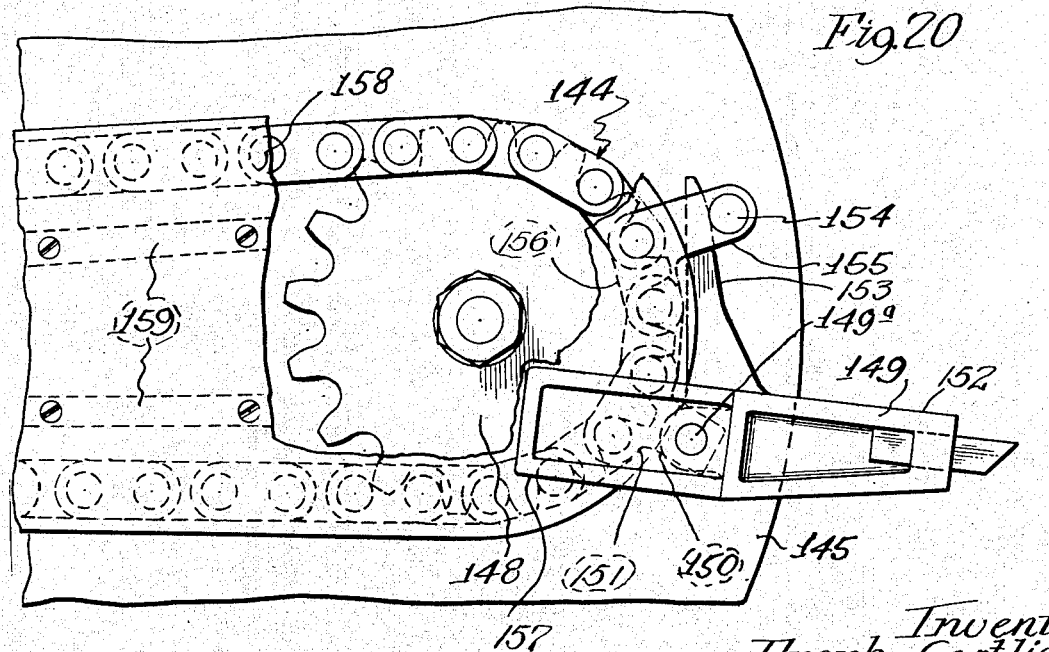
Inventor
Frank Cartlidge
Clarence F. Poole
Attorney Patented Jan. 7, 1936

2,027,091

UNITED STATES PATENT OFFICE 2,027,091

LOADING MACHINE

Frank Cartlidge, Chicago, Ill., assignor to Goodman Manufacturing Company, Chicago, Ill., a corporation of Illinois Application August 2, 1930, Serial No. 472,701
Renewed April 26, 1935

22 Claims. (Cl. 198—8)

This invention relates to improvements in material gathering and loading machines particularly adapted for loading coal at the working face of a mine. The principal object of the invention is to provide a simple and efficient mechanism of the character described, including a track mounted self-propelled truck, and a gathering and loading element in advance of the truck capable of being swivelled to various angles and telescopically advanced or retracted relative to its truck. Other features of the invention will appear from time to time as the following description proceeds.

The invention may best be understood by reference to the accompanying drawings, in which:

Figure 1 is a view in side elevation of a machine constructed in accordance with my invention, showing parts of the rear conveyor broken away;

Figure 2 is a plan view of the machine shown in Figure 1;

Figure 3 is an enlarged view in side elevation showing the rear part of the machine;

Figure 4 is an enlarged view in side elevation showing the central part of the machine;

Figure 5 is a plan view of the rear part of the machine, drawn to a slightly larger scale than Figure 3;

Figure 6 is a plan view of the central part of the machine drawn to a slightly larger scale than Figures 3 and 4;

Figure 7 is a horizontal section of the main transmission gear case;

Figure 10 is a detail plan view of the gear train connecting the main gear case and the swivelling and elevating mechanism for the loading head;

Figure 11 is a detail section taken on line 11—11 of Figure 10, but showing the arrangement of the trailing conveyor above said gear train;

Figure 13 is a detail section taken on line 13—13 of Figure 4, showing the horizontal pivotal connection for the loading element;

Figure 14 is a detail section taken on line 14—14 of Figure 6, showing details of one of the elevating screws;

Figure 15 is a detail view in side elevation of the loading element, showing the arrangement of the conveyor chain whereby the loading element may be telescoped to advance or retract the loading head;

Figure 16 is a detail section taken on line 16—16 of Figure 15, showing the change speed and reversing mechanism for advancing or retracting the loading head;

Figure 17 is a detail section taken on line 17—17 of Figure 15, showing the control devices for the mechanism shown in Figure 16;

Figure 18 is an enlarged detail section taken on line 18—18 of Figure 2, and showing the drive mechanism for the gathering and loading chain; and Figures 19 and 20 are enlarged details of the gathering and loading chain and sprocket, showing the gathering arms in two different positions.

Figure 8:
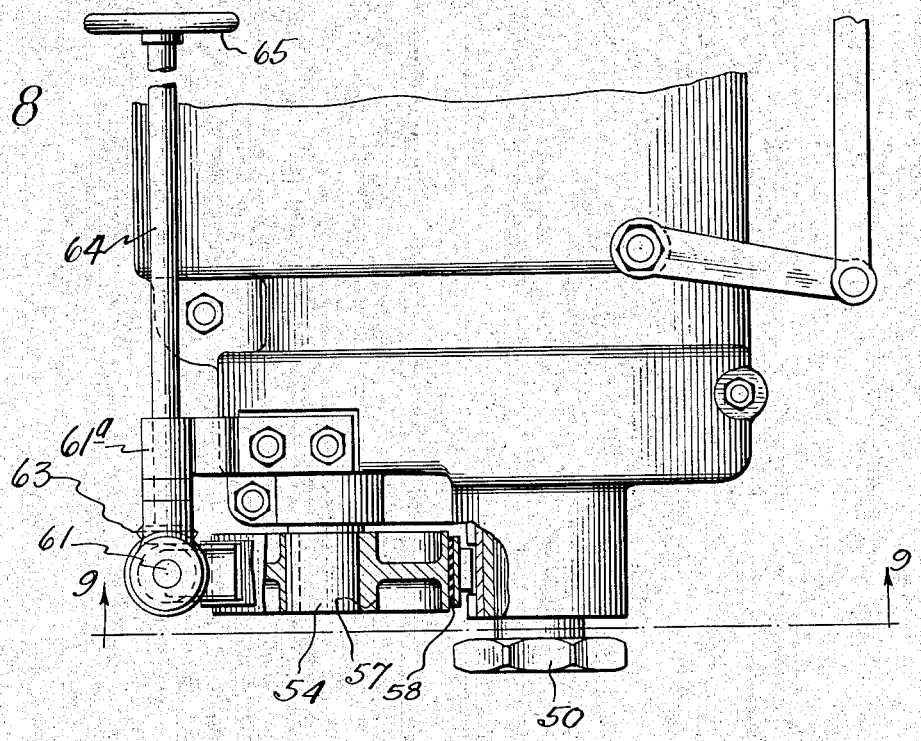
Figure 8 is a detail plan view of one end of the main transmission case, showing the arrangement of the emergency brake and the control means therefor.

Referring now to details of the machine as shown in Figures 1 and 2, the main elements thereof consist of a wheeled truck or main frame 10, an inclined loading element 11 at the front end of said frame, and a discharge conveyor 12 extending from beneath the rear end of said loading element and thence upwardly and rearwardly in extended overhanging position beyond the rear end of said main frame, so as to discharge material into cars or the like.

The main operating parts of the machine are driven from a motor 15, supported at the rear end of the main frame 10 between side frame members 16, 16 thereof. Said motor has power connections for driving the truck wheels, for swinging the loading element in a horizontal plane, for raising or lowering said loading element relative to the ground, for driving the gathering devices and associated conveyor, and for extending or retracting the gathering devices of said loading element, all of which will presently appear.

Figure 9:
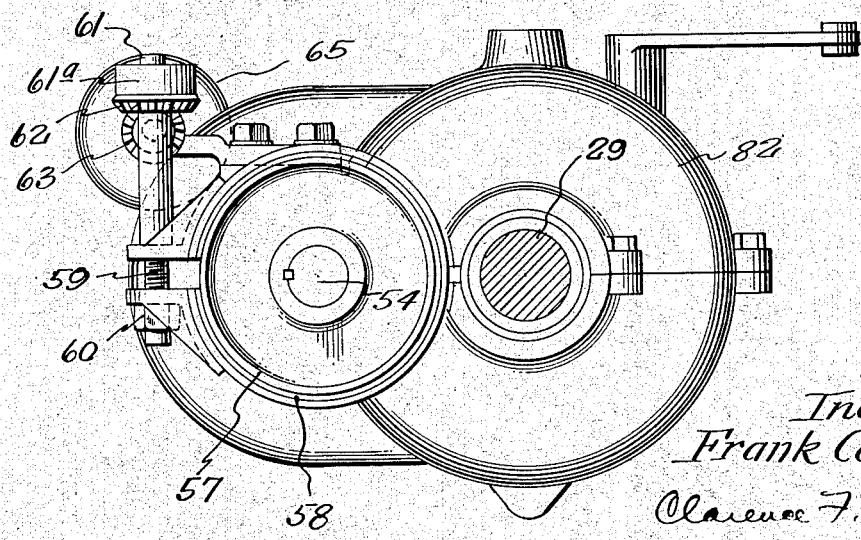
Figure 9 is a detail end view of the parts shown in Figure 8.

The truck driving connections are provided through a main transmission gear case 18, disposed in front of the motor. Details of said gear case are shown in Figures 7, 8, and 9. Referring to Figure 7, the motor armature shaft is indicated at 19, having a pinion 20 keyed thereon meshed with gear 21 on stub shaft 22. A pinion 23 on shaft 22 is meshed with gear 24 on another stub shaft 25, disposed in axial alignment with the armature shaft 19. The gearing just described affords a double reduction in gear ratio. Anti-friction bearings are preferably provided, the shaft 22 having roller bearings indicated at 55

22a and 22b and the shaft 25 having ball bearings indicated at 25a and 25b.

A bevel gear 26 is mounted on the end of shaft 25, and is meshed with reversing gears 27 and 28 loosely mounted on a transverse shaft 29. Said reversing gears form part of a clutch mechanism for selectively driving the shaft 29 in opposite directions through friction disc clutches 30 and 31, of the usual construction, associated with said gears 27 and 28, respectively. Said clutches are actuated through sliding pressure fingers 30a, 30a, and 31a, 31a, carried by plates 30b and 31b, respectively, mounted on the clutch parts 32 and 33 keyed on shaft 29.

The plates 30b and 31b are interlocked for simultaneous actuation by a pair of rods 35, 35 disposed above and below the shaft 29, so one clutch is released before the other clutch is engaged. Said plates are shifted by means of a pair of rods 36, 36 connected to plate 30b and extending through one end of the gear casing 18. A cross bar 37 on the outer ends of rods 36, 36 has a slot 37a in which a shifter arm 38 moves. Said shifter arm is carried on the lower end of an upright shaft 38a (see Fig. 6). For convenience, this shaft is operated through a lever 39, link 40 and lever 41 on another shaft 42 disposed near the forward end of the truck, and having a ratchet 43 at its upper end adapted to be selectively engaged at varying angles by a pawl 44 on handle 44a. The arrangement is such that the handle 44a may be used in an outwardly extending angle while the operator is standing beside the machine, but when the machine is travelling over considerable distances, the operator may swing the handle rearwardly to an angle closer to the side of the machine, so as to be readily operated while the operator is riding on a platform 47 carried at the side of the truck.

The shaft 29, selectively driven in opposite directions through reverse gears 27 and 28 as described, may be connected to drive the chain sprocket 50 directly through sliding clutch 51 and clutch jaws 52 on the sliding clutch 51 which mesh with clutch jaws 52a on a gear 56, or indirectly through reduction gearing, including pinion 51a on clutch member 51, gear 53, shaft 54, and gears 55 and 56. The shaft 54 also carries thereon a brake drum 57 (see Figs. 8 and 9) controlled by friction brake band 58, and having suitable operating devices; as, for example, a shaft 61 having a reduced screw portion 59 threaded in nut 60. The shaft 61 has bearing in bracket 61a, and carries a bevel gear 62 which is meshed with bevel gear 63 on shaft 64, extending to the opposite side of the machine, where it is controlled by hand wheel 65. This brake is operable at both high and low speeds to control the traction wheels while travelling from place to place, or to anchor the machine during loading operations.

The chain sprocket 50 is connected to the truck wheels through chain 68 and chain sprocket 69 on front axle 70. Another chain 71 at the opposite side of the machine connects sprockets 72 and 73 on the front and rear axles 70 and 74, respectively, so as to provide traction on all four wheels.

Figure 12:
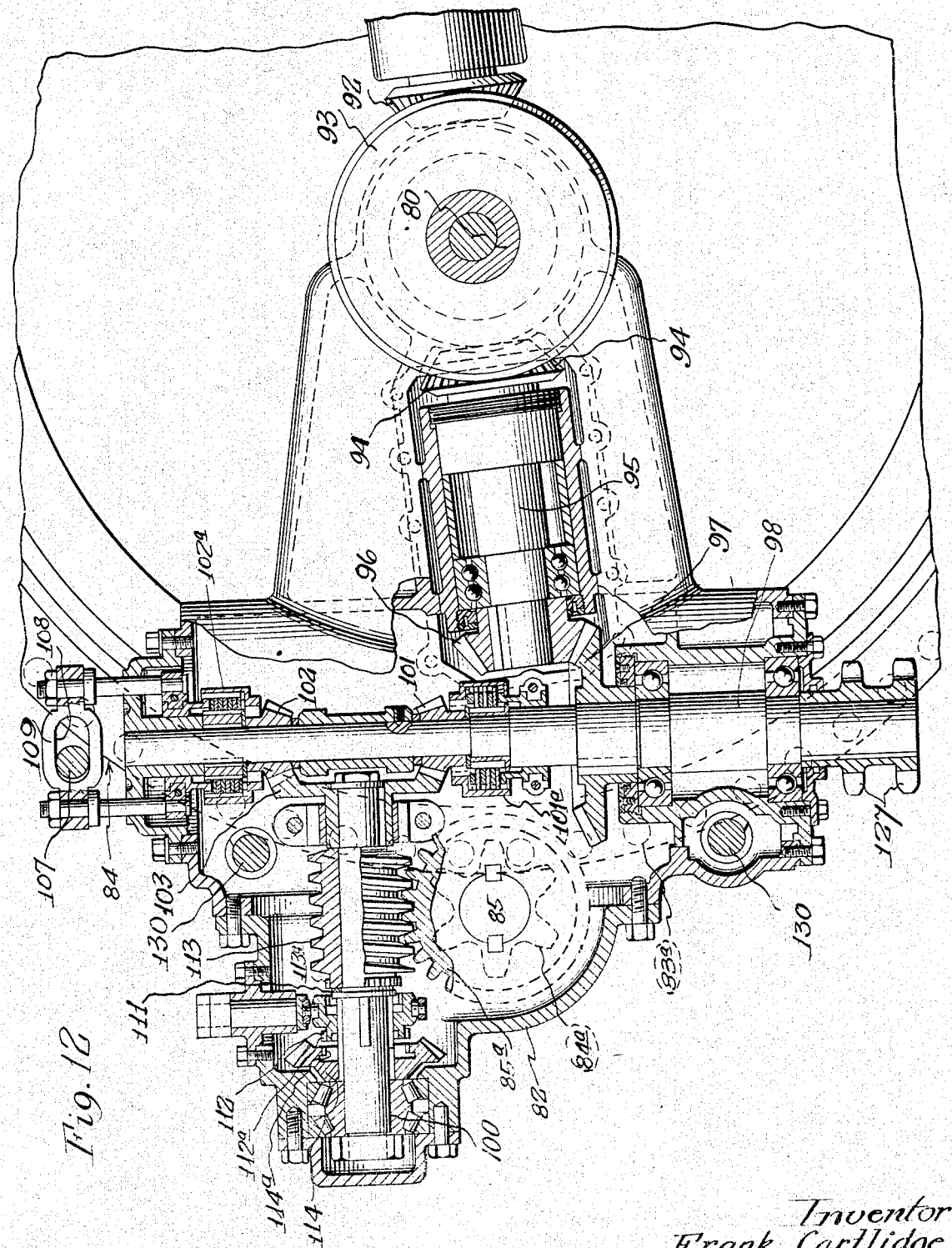
Figure 12 is an enlarged detail view of the swivelling and elevating mechanism shown in Figures 10 and 11.

Referring now to the drive connections for swinging the loading element about a vertical axis, it will be observed in Figures 10, 11, and 12, that the main frame 10 carries a centrally disposed, upright stud 80 on which is journalled a sub-frame 81 extending forwardly therefrom and forming the main part of said loading element. Said sub-frame includes a gear case 82 having sliding and swinging engagement on an arcuate guide support 83 formed integrally with the main frame 10. Said guide support is provided with a rack 84, herein consisting of a plurality of upright studs 83a, which are engaged by a sprocket 84a on an upright shaft 85 journalled in the gear case 82.

The mechanism in the gear case 82 is driven in all angular positions of the sub-frame 81 through shaft 90 driven at its rear end through bevel pinion 91 meshed with the reverse gears 27 and 28 in main transmission case 18, and a bevel pinion 92 meshed with a bevel gear 93 mounted concentrically on the central stud 80 about which the entire sub-frame 81 swings. A bevel pinion 94 keyed on stub shaft 95 is journalled on the sub-frame 81 forwardly of the bevel gear 93 and is meshed with the latter. A bevel pinion 96, also keyed on shaft 95 is meshed with bevel gear 97 keyed on cross shaft 98, as is best seen in Figure 12.

A longitudinal shaft 100 has bearing in the gear case 82 forwardly of shaft 98, and is connected to be driven by said shaft through reversing clutch mechanism, including gear 103 on shaft 100, meshed with bevel gears 101 and 102, having friction disc clutches 101a and 102a, respectively, of the usual type, arranged to selectively drive said shaft 100 in opposite directions. Said clutches are controlled by a handle 105 on shaft 106 having an arm 107 working in slot 108 of cross arm 109, which connects the outer ends of shifter rods 110, 110 extending through the end of gear case 82 into engagement with clutch 102a. The clutches 101a and 102a are connected for simultaneous operation in the usual manner, substantially as described in connection with the reversing clutches 30 and 31 in the main transmission gear case 18.

The shaft 100 has a sliding clutch element 112 thereon of the gear type having internal teeth 111 adapted to engage with external teeth 113a of worm 113 loosely mounted on said shaft when shifted rearwardly, and also having external gear teeth 112a adapted to engage internal gear teeth 114a on bevel gear 114 loosely mounted adjacent the front end of said shaft.

The worm 113 is meshed with worm gear 85a on vertical shaft 85, which has previously been described as carrying the sprocket 84a which engages the rack 84 for swinging the sub-frame 81 from side to side. It will now be understood that the mechanism just described serves to move said loading element in either direction under power of the motor.

The bevel gear 114, which may also be driven from shaft 100 through clutch element 112 as described, provides a driving connection for the loading chute elevating mechanism, as will appear more fully after the general features of construction of said loading chute and its means of mounting on the loading element sub-frame are more specifically pointed out.

The sub-frame 81 has a pair of upright side plates 120, 120 extending above the gear case 82, and including rearwardly projecting brackets 121, 121 which form trunnions for the upper and rear end of a loading chute frame 122. The pivotal mounting of said chute frame is shown in detail in Figure 13. A bearing sleeve 124 is mounted in each side bracket 121, and has a conveyor frame side plate 125 journalled thereon. Said sleeve also provides journal bearing for a conveyor shaft 126 which extends therethrough, and is provided with a suitable antifriction bearing element 126a as shown. Said conveyor shaft has loosely mounted thereon a pair of chain sprockets 127, 127, driven by chains 128, 128 extending to sprockets 129, 129 on shaft 98. A sliding clutch element 129a on the end of shaft 126 is provided to establish driving engagement between chain sprockets 127, 127 and shaft 126. Details of the conveyor mechanism will appear herein after the chute mechanism has been described.

The conveyor frame is elevated by power through a pair of screw jacks 130, 130 mounted in the sub-frame 81 as shown in detail in Figure 14. Said screw jacks are each threaded in a sleeve 131 rotatably mounted in a bearing member 133 on the sub-frame. Said sleeves have sprockets 132 attached thereto which are driven simultaneously by a chain 134 arranged as shown by dotted lines in Figure 6, said chain also passing over an idler sprocket 135 and drive sprocket 136. The driving connections for said drive sprocket are shown in Figures 10, 11, and 12. The clutch 112 on shaft 100 is movable into engagement with the internal gear teeth 114a on the bevel gear 114. Said bevel gear meshes with a bevel gear 138 which is keyed on a vertical shaft 139 which carries the chain drive sprocket 136 at its upper end (see Fig. 11).

The upper ends of the screw jacks 130, 130 are slotted and have a bar 140 seated therein arranged transversely of the frame. The ends of said bar are guided for vertical movement between two pairs of rails 141, 141 mounted on the inner faces of each side plate 125. The bar 140, when elevated, engages the under edges of the conveyor side plates 125, to raise said frame bodily.

A pair of springs 142, 142 are pivotally mounted at the front end of the sub-frame 81 and in supporting engagement with the conveyor side plates 125, as seen in Figures 1 and 4.

A gathering element 143 is provided at the front end of the loading chute frame 122 and comprises a pair of endless chain devices 144, 144 arranged to travel in laterally spaced relation on an apron or slate 145 somewhat wider than the conveyor frame and disposed at an angle to the ground slightly greater than that of the latter. The chain devices 144 each consist of a double chain 146 passing over a double sprocket 147 near the upper edge of the apron and a somewhat larger sprocket 148 near the lower or front edge of said apron. The chain carries a plurality of gathering fingers 149, 149, details of which are best seen in Figures 18, 19, and 20. Each gathering finger 149 is pivotally mounted on a pin 149a passing through lateral projections 150 carried on a pair of coincident chain links 151, 151, and has a flat gathering portion 152 extending substantially beyond the chain. In order to support the fingers relative to the chain, said fingers are each provided with a lug 153 extending forwardly thereof, into sliding engagement beneath a pin 154 carried on a projection 155 of a pair of coincident links 156 mounted forwardly of the links 151, 151 which carry the gathering fingers 149. A scraper member 157 is also formed integral with each finger and extends inwardly above an overlaying cover plate 158 mounted on supports 159, 159 extending between the sprockets 147 and 148 (see Fig. 18) so as to clear the cuttings from this plate as the gathering element advances.

The fingers 149 are arranged to swing about the lower sprocket 148 with their ends projecting in digging and gathering position beyond the front end of the apron 145, and thence upwardly to discharge their load upon the lower end of a conveyor 165. The two chain devices are disposed so as to be inclined outwardly from their lower forward inner sides to their upper rearward sides to allow material being loaded to be cleared from the chains and discharged through a suitable discharge opening between said endless chains in the apron 145 and to prevent material from being carried entirely around said chain devices instead of being discharged through the proper discharge opening, and the fingers of each device are preferably arranged in staggered relation to each other, as clearly seen in Figure 2.

The gathering devices are driven through the chain conveyor 165 on the forward loading chute frame 122 which chain conveyor is in turn driven through sprockets 126b on drive shaft 126 at the upper end of the loading chute frame 122 and is disposed beneath said endless chain devices at an acute angle thereto and at a less angle of incidence with respect to the ground than said endless chain devices.

The conveyor chain passes over sprockets 160 on shaft 161 at the front end of the conveyor frame, and said shaft has a bevel gear 162 at each end meshed with a bevel gear 163 on upright drive shafts 164 which carry the rear sprockets 147 of the two gathering devices.

Means are also provided for extending or retracting the gathering end of the loading element by means of telescoping an intermediate portion of the conveyor frame, and maintaining the tension of the forward conveyor 165 as will now be described.

The two side plates 125, 125 of the loading chute frame 122 are telescopically adjustable relative to side plates 125a, 125a which form the support for the front end of said loading chute frame 122. This construction is best shown in Figures 15, 16, and 17. The upper side plates 125 are connected by tie plates 167 and 168 forming a box like structure, while the lower side plates 125a are connected by similar tie plates 169 and 170 which overlap below and above the respective tie plates 167 and 168 and are slidable longitudinally thereof during extension and retraction of the front end of the loading chute.

The conveyor 165 consists of a pair of endless chains 172, 172 trained about sprockets 126b, 126b on drive shaft 126 at the upper end of the loading chute frame 122 as previously described. Said chains have cross members 173 disposed at suitable intervals thereon to carry the material along the base plate of the conveyor which in the lower extensible portion consists of the tie plate 170 and in the upper section consists of the tie plate 168. The upper or operating flight of the endless chain conveyor therefore extends along and above the plates 168 and 170 to the idler sprockets 160 on shaft 161 and thence rearwardly about a pair of sprockets 175 on shaft 176. The latter shaft has bearing at opposite ends in the extensible side plates 125a, 125a (see Fig. 17). The conveyor chains thence pass forwardly around idler sprockets 177, 177 carried near the front end of the side plates 125 and thence rearwardly over guides 178 and 179 to the drive sprockets 126b. By means of this arrangement of the conveyor chains 172, the extensible portion of the chain 172 may be advanced or retracted while maintaining uniform tension of said conveyor chains.

Means are also provided for advancing and retracting the front end of the conveyor frame by power derived through the conveyor chains 172 as will now be described.

The sprockets 175, about which the conveyor chains 172 are trained, are keyed at 175a on shaft 176. A pinion 180 is mounted on one end of said shaft and is meshed with a gear 181 forming part of a two speed variable feed planetary drive indicated generally at 182. This device is carried on the outer end of a shaft 183 which is parallel with and adjacent to the shaft 176 (see Fig. 17).

The variable feed planetary drive 182 consists of the gear 181 which is loosely mounted on the end of shaft 183 and has a sun gear 184 which meshes with planetary pinions 185, 185 forming one part of planetary gears 186, 186, said planetary gears also carry another set of pinions 187 of relatively greater pitch diameter than the pinions 185, said pinions 187 being meshed with an internal gear 188 of a rotating member 189 which is keyed on the outer end of shaft 183. The smaller diameter pinions 185 of planetary gears 186 are meshed with an internal gear integral with a cage 190 which is loosely mounted on the outer periphery of the rotating member 189. Said cage has a friction band 191 adapted to restrain movement thereof when driving through the planetary gears.

The friction band 191 is applied in any suitable manner; as, for instance, by means of a hand wheel 192 shown at one side of the loading chute frame 122 adjacent the upper end thereof, in position to be readily manipulated by the operator. Since said hand wheel is mounted on the fixed portion of the loading element, and the brake band is supported on the telescoping portion of said conveyor frame, I provide a telescoping operating connection including a chain 193a passing over sprocket 194 of hand wheel shaft 193b and an idler sprocket 195 carried on the bracket 195a supported on the fixed side plate 125. The chain 193a also passes over idler sprockets 196, 196 carried on the telescoping side plate 125a, and from thence over a sprocket 197 on screw shaft 197a. Said screw shaft engages a pair of lugs 191a and 191b on the ends of the brake band 191.

By applying tension on the brake band 191 through the control mechanism just described, the cage 190 is held against rotation, and the planetary pinions 185, meshing with the internal gear integral with the cage 190, on member 189, rotate the latter member in a reverse direction. The latter member, being keyed to the shaft 183, rotates pinions 199, 199 thereon. Said pinions 199 are meshed with racks 200, 200 carried on the outer side of the fixed side plates 125, 125, thereby causing the telescopic portion of the conveyor frame to move forwardly at a relatively low speed through the gear reduction provided by cooperation of the planetary gears and the member 189, as described.

Upon moving the control chain 193a to release the brake band 191, said chain also carries a stop 202 in position to engage an arm 203 pivoted on bracket 203a. This arm shifts an end plate 204 keyed on the outer end of the shaft 183 toward a plurality of friction plates 201 forming part of a multiple disc clutch. When pressure is applied to said friction plates in this manner, the end plate 204 and member 189 are caused to rotate in unison in the same direction, and carry with them the cage 190 and the planetary gears 186, which no longer perform any driving function. Since the member 189 and end plate 204 are both keyed on shaft 183, the pinions 199, 199 meshed with the racks 200, 200 will be rotated in a direction to move the telescoping portion of the conveyor frame in a rearward direction, but at a greater speed than when it is driven forwardly through the planetary gear reduction mechanism, as previously described.

It will now be understood that the loading mechanism at the front end of the conveyor frame may be advanced under power at a relatively low speed and retracted at a relatively high speed.

The discharge conveyor 12 extending to the rear end of the machine is preferably mounted on a separate frame 210 which is supported adjacent its front end on trunnions 211 carried by bracket 212 so as to afford rocking movement of said discharge conveyor on a transverse axis. The discharge conveyor 12 is also mounted for rotational movement on a vertical axis, in the form shown this arrangement being provided by mounting the supporting bracket 212 on the upright stud 80 (see Figs. 10 and 11) which also forms a pivotal axis about which the subframe 81 swings.

Suitable means for supporting the rear end of the discharge conveyor is provided, herein consisting of an arcuate supporting member 213 upon which the rear portion of the frame 210 rests for lateral sliding movement.

The supporting member 213 is provided with elevating means, consisting of a pair of screws 214, 214 projecting downwardly from the supporting member 213 and threaded in sleeves 215 mounted above brackets 216 on upright supports 216a, in the form shown said upright supports are connected to the side frame members 16, 16 of the main frame 10. The screws 214 are preferably provided for operation in unison by means of an endless chain 218, which connects sprockets 219, 219 on the two sleeves 215 and rotates them simultaneously. A hand wheel 220 is mounted on one of the sleeves 215 and through chain 218 the entire supporting member 213 is raised or lowered at uniform levels as desired.

The conveyor carried by the discharge conveyor 12 may be of any suitable form, as shown herein, consisting of a pair of endless chains 225, 225 having cross members 226 at spaced intervals and passing over idler sprockets 227 and 228 at opposite ends of the conveyor in the usual manner. Any suitable means for driving the discharge conveyor may be provided, in the form shown, said means consisting of a separate motor 230 mounted at one side of the conveyor frame 210 operating conveyor chain drive sprockets 231 through a suitable gear reduction mechanism 232.

Although I have herein shown and described one form in which my invention may be embodied, it will be understood that the construction thereof and the arrangement of the various parts may be altered without departing from the spirit and scope thereof. Furthermore, I do not wish to be construed as limiting myself to the specific embodiment illustrated in the drawings, excepting as it may be limited by the appended claims.

I claim as my invention:

1. In a loading machine, a loading element comprising an endless chain guided for orbital movement, a gathering finger mounted on a link of said chain, a supporting member carried by said finger and extending along said chain, and auxiliary supporting means carried by an adjacent link and having endwise movable connection with said supporting member.

2. In a loading machine, a loading element comprising an endless chain guided for orbital movement, a gathering finger mounted on a link of said chain, a supporting member carried by said finger and extending along said chain, and a loop carried by an adjacent link and extending in sliding engagement over said supporting member.

3. In a loading machine, a loading element including a chain guiding means including a top and bottom plate and spacing means forming a guide therebetween, an endless chain guided for orbital movement in said guiding means, a gathering finger pivotally mounted on a link of said chain and adapted to extend laterally therefrom, means for limiting pivotal movement of said finger, said finger having an inwardly extending portion overlapping said top plate for clearing material from the same.

4. In a loading machine, a main frame, a motor, traction means supporting said main frame, an inclined conveyer extending forwardly therefrom, means for supporting said inclined conveyer for pivotal movement about a horizontal axis disposed adjacent its rearward end and about a vertical axis disposed rearwardly of its rearward end comprising a casing supported on said main frame for pivotal movement about a vertical axis disposed rearwardly of the rearward end of said inclined conveyor and having upstanding support members for pivotally supporting the rearward end of said inclined conveyer for movement about a horizontal axis, and means journaled in said casing and driven by said motor for driving and selectively elevating or swinging said inclined conveyer.

5. In a loading machine, a main frame supported on traction devices and axles, a motor on said main frame rearwardly of the rearwardmost traction devices, an inclined conveyor on said main frame forwardly of the forwardmost traction devices, a bearing support member pivoted on said main frame for movement about a vertical axis disposed forwardly of the forwardmost traction devices, said bearing support member forming a pivotal support for said inclined conveyer for pivotal movement about a horizontal axis disposed adjacent the rearward end of said conveyer and horizontal swinging movement about said vertical axis which is disposed rearwardly of the rearward end of said gathering and loading element, and a discharge conveyor pivotally mounted for movement about an axis coaxial with the axis of pivotal movement of said bearing support member and extending from a point beneath said inclined conveyer over and rearwardly of said motor.

6. In a loading machine, a main frame, a motor, traction means driven by said motor supporting said main frame, a gathering and loading element extending forwardly of said main frame including an inclined conveyor having gathering chains on opposite sides thereof and extending forwardly therefrom, means for supporting said gathering and loading element for pivotal movement about a horizontal axis disposed adjacent its rearward end and about a vertical axis disposed rearwardly of its rearward end comprising a casing supported on said main frame for pivotal movement with respect thereto about a vertical axis disposed rearwardly of the rearward end of said gathering and loading element and having upstanding support members for supporting said gathering and loading element, and means enclosed by said casing and driven from said motor for driving said inclined conveyor and gathering chains, and elevating or swinging said gathering and loading element.

7. In a loading machine, a main frame, a motor, traction means driven by said motor and supporting said main frame including a pair of spaced axles having track wheels thereon, a gathering and loading element extending forwardly of said main frame and a discharge conveyor extending rearwardly of said main frame and carried thereby for pivotal movement about a vertical axis disposed forwardly of the forwardmost axles, said gathering and loading element including an inclined conveyor having gathering means on each side thereof and extending forwardly of said inclined conveyor, and said inclined conveyor being pivotally movable about a horizontal axis disposed rearwardly of the forward end of said discharge conveyor and about a vertical axis disposed coaxial with the axis of pivotal movement of said discharge conveyor.

8. In a loading machine, a main frame, a motor, traction means driven by said motor and supporting said main frame including a pair of spaced axles having track wheels thereon, a gathering and loading element extending forwardly of said main frame and a discharge conveyor extending rearwardly of said main frame and carried thereby for pivotal movement about a vertical axis disposed forwardly of the forwardmost axles, said gathering and loading element including an inclined conveyor having gathering means on each side thereof and extending forwardly of said inclined conveyor, and said inclined conveyor being pivotally movable about a horizontal axis disposed rearwardly of the forward end of said discharge conveyor and about a vertical axis disposed coaxial with the axis of pivotal movement of said discharge conveyor, means driven by said motor for driving said inclined conveyor and gathering means and swinging or elevating said inclined conveyor including a shaft extending transversely of said inclined conveyor and movable therewith, and means for encasing said shaft and drive means, said means having parallel spaced upstanding side members thereon extending over and rearwardly of said discharge conveyor and forming a pivotal support for said inclined conveyor.

9. In a loading machine, a main frame, supporting means for said main frame comprising axles having track wheels thereon, said main frame rearwardly of said rearwardmost track yond said track wheels, a motor on said main frame rerawardly of said rearwardmost track wheels, a discharge conveyor pivotally supported on said main frame for pivotal movement about a vertical axis disposed forwardly of said forwardmost track wheels and extending rearwardly along said main frame over said motor, a gathering and loading element extending from a position above the forward end of said discharge conveyor downwardly towards the ground, and means for supporting said gathering and loading element for pivotal movement with respect to said main frame about a vertical axis coaxial with the axis of pivotal movement of said discharge conveyor comprising a pivotal support member for said inclined conveyor pivotally connected to said main frame for swinging movement with respect thereto in a horizontal plane, said pivotal support member having upstanding side members thereon having connection with said inclined conveyor for pivotal movement about an axis extending transversely thereof.

10. In a loading machine, a main frame, supporting means for said main frame comprising axles having track wheels thereon, said main frame extending forwardly and rearwardly beyond said track wheels, a motor on said main frame rearwardly of said rearwardmost track wheels, a discharge conveyor pivotally supported on said main frame for pivotal movement about a vertical axis disposed forwardly of said forwardmost track wheels and extending rearwardly along said main frame over said motor, a gathering and loading element extending from a position above the forward end of said discharge conveyor downwardly towards the ground, and means for supporting said gathering and loading element for pivotal movement with respect to said main frame about a vertical axis coaxial with the axis of pivotal movement of said discharge conveyor comprising a pivotal support member for said inclined conveyor pivotally connected to said main frame for swinging movement with respect thereto in a horizontal plane, said pivotal support member having upstanding side members thereon having connection with said inclined conveyor for pivotal movement about an axis extending transversely thereof, and drive connections from said motor including a bevel gear coaxial with the axis of pivotal movement of said discharge conveyor and pivotal support member and disposed beneath said discharge conveyor, a longitudinal shaft driven by said motor and extending forwardly and angularly downwardly from a point disposed rearwardly of said bevel gear, a longitudinal shaft on the opposite side of said bevel gear from said first-mentioned bevel gear and extending angularly upwardly with respect thereto, a transversely extending shaft journaled in said pivotal support for movement therewith and driven by said second-mentioned longitudinally extending shaft, and drive connections from said shaft for independently swinging or elevating said gathering and loading element and driving said gathering and loading element.

11. In a loading machine, a main frame comprising a truck supported on track wheels and axles, a motor on said main frame rearwardly of the rearwardmost track wheels, a gathering and loading element on said main frame forwardly of the forwardmost track wheels, a vertical stud disposed forwardly of the forwardmost track wheels, a casing pivoted thereon and adapted to extend forwardly therefrom, said casing forming a support for said gathering and loading element to permit pivotal movement thereof about a horizontal axis disposed adjacent its rearward end and horizontal swinging movement about the axis of said stud which is disposed rearwardly of the rearward end of said gathering and loading element, and means for driving said gathering and loading element from said motor and elevating and swinging said gathering and loading element at frictionally controlled speeds in reverse directions without reversal of said motor including a drive shaft driven from said motor and extending transversely of and journaled in said casing for movement therewith.

12. In a loading machine, a main frame comprising a truck supported on track wheels and axles, a motor on said main frame rearwardly of the rearwardmost track wheels, a gathering and loading element on said main frame forwardly of the forwardmost track wheels, a vertical stud disposed forwardly of the forwardmost track wheels, a casing pivoted thereon and adapted to extend forwardly therefrom, said casing forming a support for said gathering and loading element to permit pivotal movement thereof about a horizontal axis disposed adjacent its rearward end and horizontal swinging movement about the axis of said stud which is disposed rearwardly of the rearward end of said gathering and loading element, and a discharge conveyor pivotally mounted on said stud and extending from a point beneath said gathering and loading element over and rearwardly of said motor.

13. In a loading machine, a main frame comprising a truck supported on track wheels and axles, a motor on said main frame rearwardly of the rearwardmost track wheels, a gathering and loading element on said main frame forwardly of the forwardmost track wheels, a vertical stud disposed forwardly of the forwardmost track wheels, a casing pivoted thereon and adapted to extend forwardly therefrom, said casing forming a support for said gathering and loading element to permit pivotal movement thereof about a horizontal axis disposed adjacent its rearward end and horizontal swinging movement about the axis of said stud which is disposed rearwardly of the rearward end of said gathering and loading element, a discharge conveyor pivotally mounted on said stud for swinging movement with respect thereto and extending from a point beneath said gathering and loading element over and rearwardly of said motor, a drive connection from said motor to said track wheels and another drive connection from said motor to said gathering and loading element for driving, swinging, and elevating said gathering and loading element comprising a bevel gear on said stud, a shaft extending longitudinally of said truck and extending rearwardly and being inclined downwardly with respect to said truck frame towards said bevel gear, said shaft being driven by said motor and forming a drive means for said bevel gear, and another shaft journaled in said casing and driven by said bevel gear, said shaft being inclined upwardly with respect to said truck from said bevel gear.

14. In a loading machine, a main frame comprising a truck supported on track wheels and axles, a motor on said main frame rearwardly of the rearwardmost track wheels, a gathering and loading element on said main frame forwardly of the forwardmost track wheels, a vertical stud disposed forwardly of the forwardmost track wheels, a casing pivoted thereon and adapted to extend forwardly therefrom, said casing forming a support for said gathering and loading element to permit pivotal movement thereof about a horizontal axis disposed adjacent its rearward end and horizontal swinging movement about the axis of said stud which is disposed rearwardly of the rearward end of said gathering and loading element, a discharge conveyor pivotally mounted on said stud for swinging movement with respect thereto and extending from a point beneath said gathering and loading element over and rearwardly of said motor, a drive connection from said motor to said track wheels and another drive connection from said motor to said gathering and loading element for driving, swinging, and elevating said gathering and loading element comprising a bevel gear on said stud, a shaft extending longitudinally of said truck and extending rearwardly and being inclined downwardly with respect to said truck frame towards said bevel gear, said shaft being driven by said motor and forming a drive means for said bevel gear, another shaft journaled in said casing and driven by said bevel gear, said shaft being inclined upwardly with respect to said truck from said bevel gear, a shaft extending transversely of said casing driven from said last-mentioned shaft, a drive connection from said shaft to said gathering and loading element, a frictionally controlled reversible drive connection from said shaft to said truck for swinging said gathering and loading element in a horizontal plane at a frictionally controlled speed and a third drive connection from said shaft for elevating or lowering said gathering and loading element.

15. In a loading machine, a main frame, supporting means for said main frame comprising axles having track wheels thereon, said main frame extending forwardly and rearwardly beyond said track wheels, a motor on said main frame rearwardly of said rearwardmost track wheels, a discharge conveyor pivotally supported on said main frame for pivotal movement about a vertical axis disposed forwardly of said forwardmost track wheels and extending rearwardly along said main frame over said motor, a pivotal support member on said main frame having an inclined gathering and loading element supported thereon for pivotal movement with respect thereto about a horizontal axis disposed rearwardly of the forward end of said discharge conveyor, and yieldable means for supporting a major portion of the weight of said gathering and loading element and transmitting said weight to the forward portion of said truck when the forward end of said gathering and loading element rests on the ground.

16. In a loading machine, a main frame, supporting means for said main frame comprising axles having track wheels thereon, said main frame extending forwardly and rearwardly beyond said track wheels, a motor on said main frame rearwardly of said rearwardmost track wheels, a discharge conveyor pivotally supported on said main frame for pivotal movement about a vertical axis disposed forwardly of said forwardmost track wheels and extending rearwardly along said main frame over said motor, a pivotal support member on said main frame having an inclined gathering and loading element supported thereon for pivotal movement with respect thereto about a horizontal axis disposed rearwardly of the forward end of said discharge conveyor, and yieldable means for supporting a major portion of the weight of said gathering and loading element and transmitting said weight to the forward portion of said main frame when the forward end of said gathering and loading element rests on the ground, comprising a spring pivotally mounted at the forward end of said pivotal support member and having supporting engagement with said gathering and loading element.

17. In a loading machine, a main frame, supporting means for said main frame comprising axles having track wheels thereon, said main frame extending forwardly and rearwardly beyond said track wheels, a motor on said main frame rearwardly of said rearwardmost track wheels, a discharge conveyor pivotally supported on said main frame for pivotal movement about a vertical axis disposed forwardly of said forwardmost track wheels and extending rearwardly along said main frame over said motor, a pivotal support member on said main frame having an inclined gathering and loading element supported thereon for pivotal movement with respect thereto about a horizontal axis disposed rearwardly of the forward end of said discharge conveyor, and yieldable means for supporting a major portion of the weight of said gathering and loading element and transmitting said weight to the forward portion of said main frame when the forward end of said gathering and loading element rests on the ground, comprising a pair of springs pivotally mounted at the forward end of said pivotal support member and having supporting engagement with opposite sides of said gathering and loading element.

18. In a loading machine, a main frame, supporting means for said main frame comprising axles having track wheels thereon, said main frame extending forwardly and rearwardly beyond said track wheels, a motor on said main frame rearwardly of said rearwardmost track wheels, a discharge conveyor pivotally supported on said main frame for pivotal movement about a vertical axis disposed forwardly of said forwardmost track wheels and extending rearwardly along said main frame over said motor, a pivotal support member on said main frame having an inclined gathering and loading element supported thereon for pivotal movement with respect thereto about a horizontal axis disposed rearwardly of the forward end of said discharge conveyor, means for pivoting said gathering and loading element about said horizontal axis and vertically adjusting the forward end thereof, and yieldable means disposed forwardly of said adjusting means for supporting a major portion of the weight of said gathering and loading element and transmitting said weight to the forward portion of said main frame when the forward end of said gathering and loading element rests on the ground.

19. In a loading machine, a main frame, supporting means for said main frame comprising axles having track wheels thereon, said main frame extending forwardly and rearwardly beyond said track wheels, a motor on said main frame rearwardly of said rearwardmost track wheels, a discharge conveyor pivotally supported on said main frame for pivotal movement about a vertical axis disposed forwardly of said forwardmost track wheels and extending rearwardly along said main frame over said motor, a pivotal support member on said main frame having an inclined gathering and loading element supported thereon for pivotal movement with respect thereto about a horizontal axis disposed rearwardly of the forward end of said discharge conveyor, means for pivoting said gathering and loading element about said horizontal axis and vertically adjusting the forward end thereof, and yieldable means disposed forwardly of said adjusting means for supporting a major portion of the weight of said gathering and loading element and transmitting said weight to the forward portion of said main frame when the forward end of said gathering and loading element rests on the ground, comprising a spring pivotally mounted at the forward end of said pivotal support member and having supporting engagement with said gathering and loading element.

20. In a loading machine, a main frame, supporting means for said main frame comprising axles having track wheels thereon, said main frame extending forwardly and rearwardly beyond said track wheels, a motor on said main frame rearwardly of said rearwardmost track wheels, a discharge conveyor pivotally supported on said main frame for pivotal movement about a vertical axis disposed forwardly of said forwardmost track wheels and extending rearwardly along said main frame over said motor, a pivotal support member on said main frame having an inclined gathering and loading element supported thereon for pivotal movement with respect thereto about a horizontal axis disposed rearwardly of the forward end of said discharge conveyor, means for pivoting said gathering and loading element about said horizontal axis and vertically adjusting the forward end thereof, and yieldable means disposed forwardly of said adjusting means for supporting a major portion of the weight of said gathering and loading element and transmitting said weight to the forward portion of said main frame when the forward end of said gathering and loading element rests on the ground, comprising a pair of springs pivotally mounted at the forward end of said pivotal support member and having supporting engagement with opposite sides of said gathering and loading element.

21. In a loading machine, a main frame supported on traction devices and axles, said main frame extending forwardly and rearwardly beyond said traction devices, a motor on said main frame rearwardly of said rearwardmost traction devices, a discharge conveyer on said main frame supported for pivotal movement about a vertical axis disposed forwardly of said forwardmost traction devices and extending along said main frame over said motor, a pivotal support member pivotally mounted on said main frame for pivotal movement about a vertical axis disposed forwardly of said forwardmost traction devices and having an inclined conveyer supported thereon and extending forwardly therefrom, said conveyer being mounted on said support member for pivotal movement about a horizontal axis disposed rearwardly of the forward end of said discharge conveyer, means for pivotally moving said inclined conveyer about said horizontal axis and vertically adjusting the forward end thereof, and yieldable means for supporting a major portion of the weight of said inclined conveyer and transmitting a greater portion of said weight to the forward portion of said main frame when the forward end of said inclined conveyer rests on the ground.

22. In a loading machine, a main frame supported on track wheels and axles, said main frame extending forwardly and rearwardly beyond said track wheels, a motor on said main frame rearwardly of said rearwardmost track wheels, an inclined conveyer having gathering means thereon extending forwardly of said main frame, said inclined conveyer being mounted forwardly of said forwardmost track wheels for pivotal movement with respect thereto about a vertical axis and about a horizontal axis spaced above said main frame, a discharge conveyer extending from said inclined conveyer rearwardly over the rearward end of said main frame, means for pivotally moving said inclined conveyer about said horizontal axis for vertically adjusting the forward end thereof, and yieldable means comprising a compression spring interposed between the forward end of said main frame and inclined conveyer for supporting a major portion of the weight of said inclined conveyer and transmitting a greater portion of said weight to the forward end of said main frame when the forward end of said inclined conveyer is in engagement with the ground.

FRANK CARTLIDGE.